United States Patent
Blaney et al.

(10) Patent No.: US 10,634,010 B2
(45) Date of Patent: Apr. 28, 2020

(54) CMC BOAS AXIAL RETAINING CLIP

(71) Applicant: United Technologies Corporation, Farmington, CT (US)

(72) Inventors: Ken F. Blaney, Middleton, NH (US); Thomas E. Clark, Sanford, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 40 days.

(21) Appl. No.: 16/122,481

(22) Filed: Sep. 5, 2018

(65) Prior Publication Data

US 2020/0072084 A1 Mar. 5, 2020

(51) Int. Cl.
*F01D 25/24* (2006.01)
*F01D 11/08* (2006.01)
*F01D 11/00* (2006.01)

(52) U.S. Cl.
CPC .......... *F01D 25/246* (2013.01); *F01D 11/005* (2013.01); *F01D 11/08* (2013.01); *F05D 2220/32* (2013.01); *F05D 2230/60* (2013.01); *F05D 2260/30* (2013.01)

(58) Field of Classification Search
None
See application file for complete search history.

(56) References Cited

U.S. PATENT DOCUMENTS

| | | | |
|---|---|---|---|
| 6,200,091 B1 | 3/2001 | Bromann | |
| 6,412,149 B1 | 7/2002 | Overberg | |
| 6,435,820 B1 | 8/2002 | Overberg | |
| 6,575,697 B1 | 6/2003 | Arilla et al. | |
| 6,666,645 B1 | 12/2003 | Arilla | |
| 7,442,004 B2 | 10/2008 | Ruthemeyer et al. | |
| 9,080,463 B2 | 7/2015 | Denece et al. | |
| 2004/0071548 A1* | 4/2004 | Wilson, Jr. | F01D 11/18 415/173.1 |
| 2012/0319360 A1* | 12/2012 | Blaney | F01D 11/08 277/590 |
| 2013/0272870 A1 | 10/2013 | Weber | |
| 2015/0044049 A1 | 2/2015 | Lamusga | |
| 2016/0090866 A1* | 3/2016 | Hurst | F01D 25/246 415/173.1 |

(Continued)

FOREIGN PATENT DOCUMENTS

WO 2005003520 1/2005

OTHER PUBLICATIONS

EP Search Report for EP Application No. 19195648.1 dated Feb. 3, 2020.

*Primary Examiner* — Michael Lebentritt
(74) *Attorney, Agent, or Firm* — Carlson, Gaskey & Olds, P.C.

(57) ABSTRACT

A blade outer air seal assembly contains a support structure. A blade outer air seal extends circumferentially about an axis and is mounted in the support structure. The support structure has a first support member that engages a first axial side of the blade outer air seal. A second support member engages a second axial side of the blade outer air seal. A retaining clip secures the blade outer air seal to the support structure. The retaining clip has a first leg and a second leg that extends in a generally radial direction. The first leg abuts the first axial side and the second leg abuts the first support member.

20 Claims, 6 Drawing Sheets

(56) References Cited

U.S. PATENT DOCUMENTS

| | | | |
|---|---|---|---|
| 2016/0177768 A1* | 6/2016 | Borja | F01D 5/02 |
| | | | 415/134 |
| 2016/0215645 A1* | 7/2016 | McCaffrey | F01D 25/246 |
| 2016/0237842 A1* | 8/2016 | Blaney | F01D 11/08 |
| 2016/0238137 A1* | 8/2016 | Clark | F01D 25/162 |
| 2016/0290150 A1* | 10/2016 | Strock | F01D 11/003 |
| 2016/0312661 A1* | 10/2016 | Duguay | F01D 25/246 |
| 2016/0319841 A1* | 11/2016 | McCaffrey | F01D 11/24 |
| 2016/0333715 A1* | 11/2016 | McCaffrey | F01D 25/246 |
| 2016/0356170 A1* | 12/2016 | Davis | F04D 29/164 |
| 2017/0248234 A1* | 8/2017 | Lutjen | F01D 11/08 |
| 2017/0268361 A1* | 9/2017 | McCaffrey | F04D 29/324 |
| 2019/0136707 A1* | 5/2019 | Palmer | F01D 11/18 |
| 2019/0292930 A1* | 9/2019 | Smiddy | F01D 11/08 |
| 2019/0353045 A1* | 11/2019 | Smiddy | F01D 25/246 |
| 2019/0368366 A1* | 12/2019 | Clark | F01D 11/005 |

* cited by examiner

CMC BOAS AXIAL RETAINING CLIP

BACKGROUND

This application relates to an axial retaining clip for a blade outer air seal.

Gas turbine engines are known and typically include a compressor for compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades.

SUMMARY

In one exemplary embodiment, a blade outer air seal assembly includes a support structure. A blade outer air seal extends circumferentially about an axis and is mounted in the support structure. The support structure has a first support member that engages a first axial side of the blade outer air seal. A second support member engages a second axial side of the blade outer air seal. A retaining clip secures the blade outer air seal to the support structure. The retaining clip has a first leg and a second leg that extends in a generally radial direction. The first leg abuts the first axial side and the second leg abuts the first support member.

In a further embodiment of any of the above, the first and second legs extend from an axial portion such that the retaining clip forms a C shape.

In a further embodiment of any of the above, the first leg and the axial portion are in contact with the blade outer air seal.

In a further embodiment of any of the above, the second leg and the axial portion are in contact with the first support member.

In a further embodiment of any of the above, the first and second legs act as a spring loaded clip.

In a further embodiment of any of the above, the first leg is longer than the second leg.

In a further embodiment of any of the above, the second leg has a flange at a radially inner end.

In a further embodiment of any of the above, the retaining clip and blade outer air seal each have a passage for cooling air.

In a further embodiment of any of the above, the retaining clip and blade outer air seal passages are circumferentially aligned to form a generally radial cooling passage.

In a further embodiment of any of the above, the blade outer air seal comprises a plurality of segments that are arranged circumferentially to form an annulus about the axis.

In a further embodiment of any of the above, the retaining clip comprises a plurality of clip segments that are arranged circumferentially to form an annulus about the axis.

In a further embodiment of any of the above, the clip segments are offset from the blade outer air seal segments.

In a further embodiment of any of the above, a number of clip segments is less than or equal to a number of blade outer air seal segments.

In a further embodiment of any of the above, the number of blade segments is a multiple of the number of clip segments.

In a further embodiment of any of the above, the support structure is a unitary circular structure.

In a further embodiment of any of the above, the retaining clip is a metallic material.

In a further embodiment of any of the above, the retaining clip is formed from sheet metal.

In a further embodiment of any of the above, the structure is a metallic material and the blade outer air seal is a ceramic matrix composite material.

In a further embodiment of any of the above, the blade outer air seal is a monolithic ceramic.

In a further embodiment of any of the above, the blade outer air seal is formed from a different material than the retaining clip.

These and other features may be best understood from the following drawings and specification.

DETAILED DESCRIPTION

Figure 1:
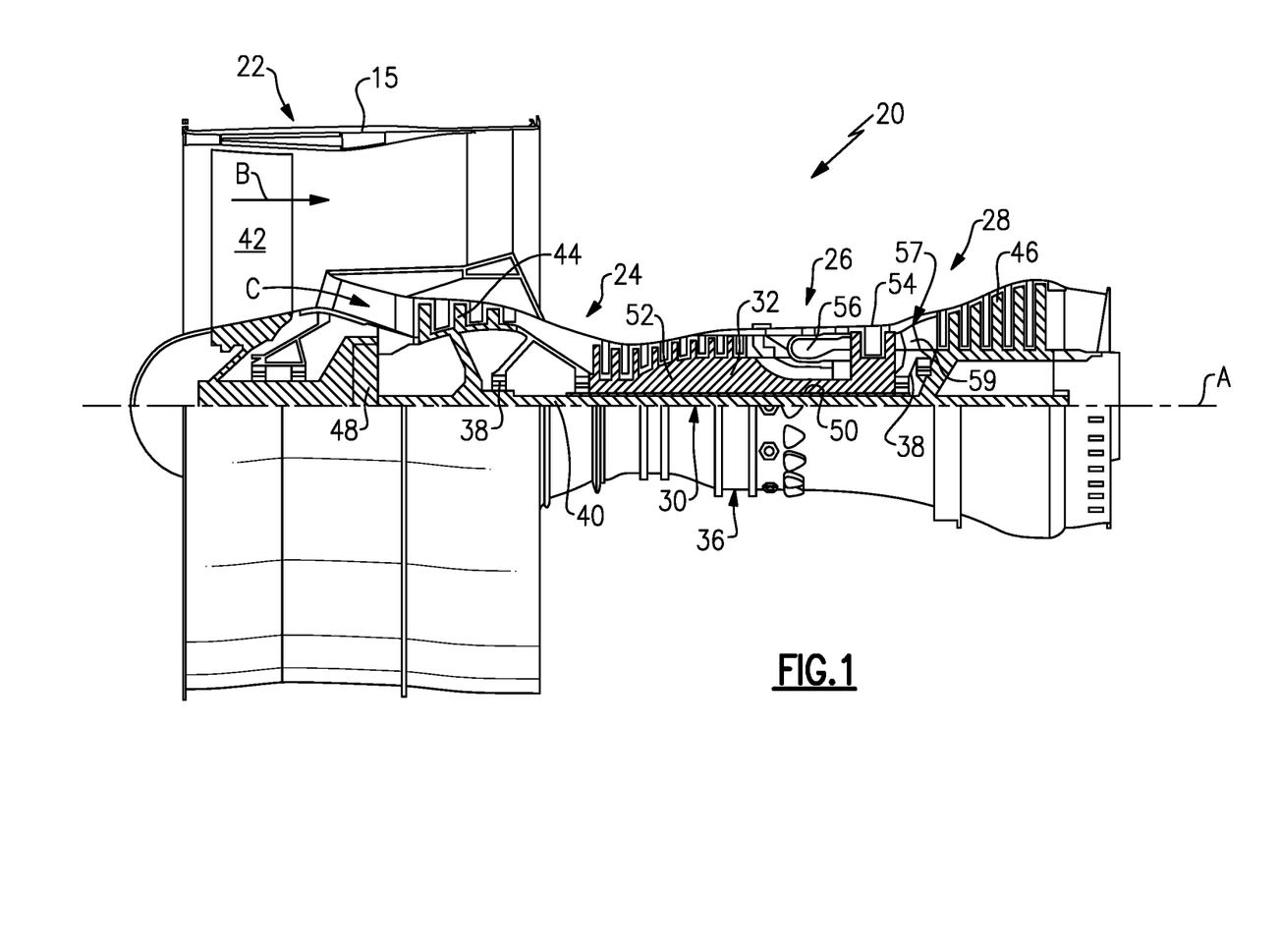
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Figure 2:
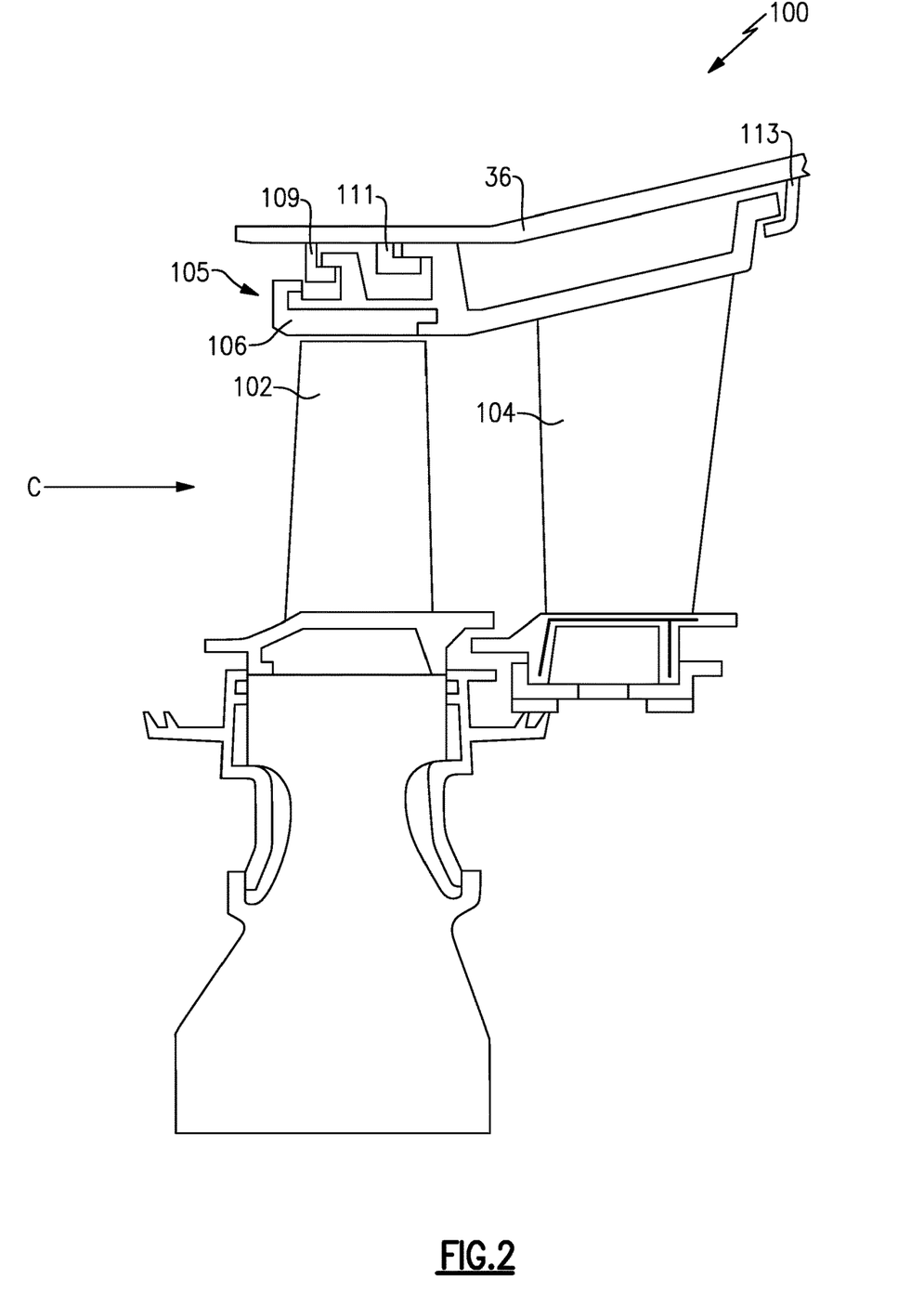
FIG. 2 schematically shows a portion of a turbine section.

FIG. 2 schematically illustrates a portion 100 of the turbine section 28. The portion 100 includes alternating series of rotating blades 102 and stationary vanes 104 that extend into the core flow path C of the gas turbine engine. Turbine blades 102 rotate and extract energy from the hot combustion gases that are communicated along the core flow path C of the gas turbine engine 20. The turbine vanes 104, which generally do not rotate, guide the airflow and prepare it for the next set of blades 102. As is known, it is desirable to pass the bulk of products of combustion downstream of the combustor section 26 across the turbine blades. Thus, an assembly 105 having a blade outer air seal ("BOAS") 106 is positioned slightly radially outwardly of the outer tip of the blades 102. It should be understood that the turbine section portion 100 could be utilized in other gas turbine engines, and even gas turbine engines not having a fan section at all.

The BOAS assembly 105 is attached to the engine static structure 36. The engine static structure 36 has a plurality of engagement features 109, 111, 113 for engagement with the BOAS assembly 105. In an embodiment, engagement features 109 and 111 are at an axial position between leading and trailing edges of the blade 102 and engagement feature 113 is aft of the vane 104. In another embodiment, engagement feature 111 is between the blade 102 and vane 104. Fewer or additional engagement features may be contemplated within the scope of this disclosure.

Figure 3:
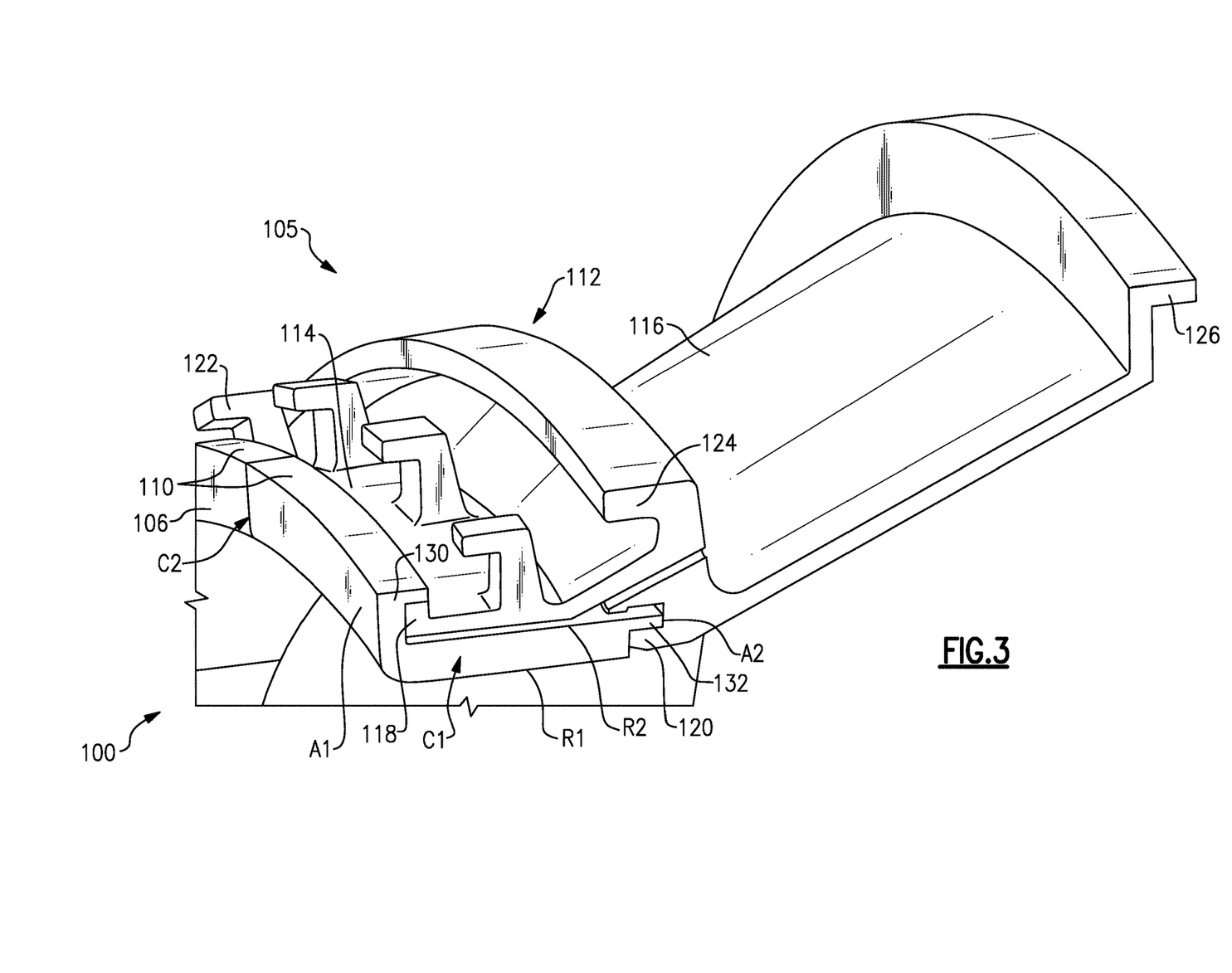
FIG. 3 shows a blade outer air seal and support structure.

FIG. 3 illustrates the BOAS assembly 105. The assembly 105 includes the BOAS 106, which is made up of a plurality of seal segments 110 that are circumferentially arranged in an annulus around the central axis A of the engine 20. The seal segments 110 are mounted in a structure 112, which is circumferentially continuous about the central axis A. The BOAS 106 is in close radial proximity to the tips of the blades 102 to reduce the amount of gas flow that escapes around the blades 102.

The seal segments 110 may be monolithic bodies that are formed of a high thermal-resistance, low-toughness material, such as a ceramic matrix composite. In another embodiment, the seal segments 110 may be formed from another material, such as a metallic alloy or monolithic ceramic. BOAS seals that are ceramic matrix composite, particularly 2D ply construction, may be difficult to mount in an engine. This disclosure may also apply to 3D and 4D ceramic matrix composite construction methods. The parts are designed so that the thermal expansion in the axial direction can more easily work with other part with different thermal expansion rations.

Each seal segment 110 is a body that defines radially inner and outer sides R1, R2, respectively, first and second circumferential ends C1, C2, respectively, and first and second axial sides A1, A2, respectively. The radially inner side R1 faces in a direction toward the engine central axis A. The radially inner side R1 is thus the gas path side of the seal segment 110 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

The seal segments 110 are mounted in the structure 112, which includes a BOAS support portion 114 and a vane platform portion 116. The BOAS support portion 114 includes a first support member 118 that radially supports a hook 130 on the seal segment 110 at an axially forward portion of the structure 114 and a second support member 120 that radially supports a lip 132 on the seal segment 110 at an axially aft portion of the seal segment 110. The first support member 118 is the axially forward-most end of the structure 112. In an embodiment, the second support member 120 is the radially innermost portion of the structure 112.

The structure 112 may include a plurality of hooks for attachment to an engine structure, such as the engine static structure 36. For example, the structure 112 may include a plurality of discrete hooks 122 extending radially outward from the BOAS support portion 114. The hooks 122 engage the engagement feature 109 (shown in FIG. 2). The structure 112 may include a continuous hook structure aft of the BOAS 106. In the illustrated embodiment, an attachment member 124 extends radially outward from the structure 112 for attachment to the engine 20. The attachment member 124 may be at the same axially position as the second support member 120, or may forward or aft of the second support member 120. The attachment member 124 engages the engagement feature 111 (shown in FIG. 2). A vane platform attachment member 126 extends radially outward from the vane platform portion 116.

In the illustrated embodiment, the vane platform attachment member 126 is axially aft of the vane 104. The vane platform attachment member 126 may be the radially outermost portion of the structure 112. The attachment member 126 engages the engagement feature 113 (shown in FIG. 2). Each of the attachment members 122, 124, 126 has a generally radially extending portion and a generally axially extending portion. Although three attachment members 122, 124, 126 and three engagement members 109, 111, 113 are shown, more or fewer may come within the scope of this disclosure.

The BOAS support portion 114 and vane platform portion 116 form a unified part. The metallic vane platform portion 116 may be used in conjunction with a CMC vane 104, so that the vane construction is multi-piece in nature. The BOAS support portion 114 is joined with the vane platform portion 116 to allow the architecture to seal more easily and use cooling air more efficiently. This architecture allows BOAS cooling air reuse so the cooling air can be used on an adjacent vane. Details of a support structure 112 are found in copending U.S. patent application Ser. No. 16/122,373, entitled "UNIFIED BOAS SUPPORT AND VANE PLATFORM" filed on even date herewith. Although a unified BOAS support portion 114 and vane platform portion 116 is illustrated, the disclosed assembly may be used in a BOAS support that is not integrated with a vane platform.

Figure 4:
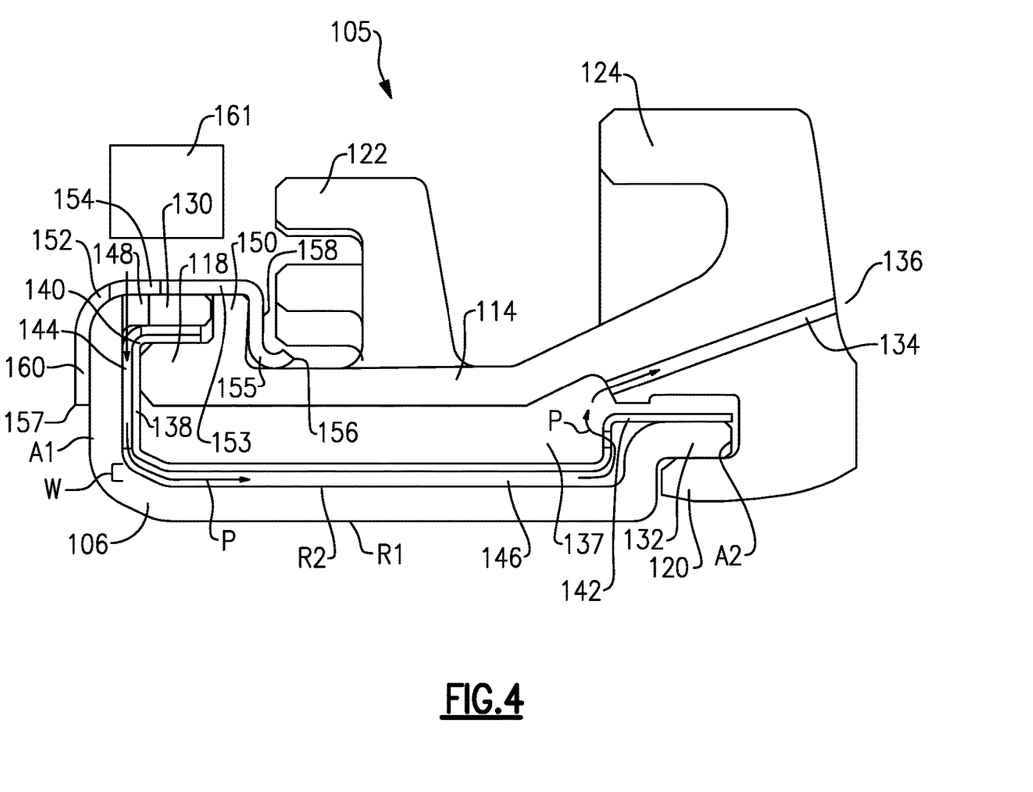
FIG. 4 shows a cross-sectional view through a blade outer air seal and support.

FIG. 4 shows a cross-section of the blade outer air seal assembly 105. A hook 130 is formed in seal segment 110 of the BOAS 106 near the first axial side A1 for engagement with the first support member 118. The hook 130 is at a forward-most portion of the seal segment 110. The hook 130 includes a radially outwardly extending portion defining the first axial side A1 and an axially extending portion that extends aft of the first axial side A1. A lip 132 is formed in the seal segment 110 near the second axial side A2 for engagement with the second support member 120. The lip 132 extends generally axially from the seal segment 110. The BOAS may be assembled in a forward to aft direction, as the hook 130 and lip 132 will be received in the first and second support members 118, 120, respectively.

A cooling air reuse port 134 extends between a vane chamber 136 and a BOAS chamber 137. The vane chamber 136 is formed between the vane platform portion 116 and an engine structure, such as the engine static structure 36 (shown in FIG. 1). The BOAS chamber 137 is formed between the BOAS support portion 114 and the BOAS 106. Cooling air enters the BOAS chamber 137 through an inlet 148 in the BOAS 106, and may be reused to cool the vane 104 by travelling through the cooling air port 134. The port 134 extends through a wall formed by attachment member 124. In one embodiment, the port 134 extends generally axially. In another embodiment, the port 134 may be a different orientation, such as generally radially, depending on the orientation of the hooks 122 and attachment member 124. For example, the port 134 may extend generally perpendicular to the axis A. The support structure 112 may include a plurality of cooling air reuse ports 134 spaced circumferentially about the support structure 112.

The port 134 re-uses cooling air that has been used for forced convection back side cooling of the BOAS 106 to cool an adjacent vane 104. The used air can then be used to cool the adjacent vane 104, reducing the amount of cooling air required to be supplied by the compressor section 24, which may improve engine cycle efficiency. In some examples, cooling air from several BOAS 106 may be reused to cool a single vane 104.

A flow guide 138 is arranged between the BOAS 106 and BOAS support portion 114. The flow guide 138 generally tracks the shape of the BOAS 106. The flow guide 138 has a hook 140 and lip 142 that generally correspond to a hook 130 and lip 132 on the BOAS 106, respectively. The flow guide 138 forces convection along the radial surface R2 of the BOAS 106. A spacer 144 may be arranged between the flow guide 138 and the BOAS 106. The spacer 144 defines and maintains a radially extending space between the spacer 144 and BOAS 106. A gap 146 is formed between the BOAS 106 and flow guide 138 having a width w, which is defined and maintained by the geometry of the flow guide 138. The flow guide 138 defines a cooling air passage P from a BOAS inlet 148 to the port 134. Cooling air enters the BOAS 106 through a BOAS inlet 148, then travels radially inward through the spacer 144 into the gap 146. Cooling air exits the gap 146 through an outlet in an aft portion of the flow guide 138, and through the port 134. Details of a flow guide 138 and spacer 144 are found in copending U.S. patent application Ser. No. 16/122,431, entitled "CMC BOAS COOLING AIR FLOW GUIDE" filed on even date herewith.

A retaining clip or retainer 152 secures the BOAS 106 to the support structure 114. In this embodiment, the retainer 152 engages the first axial side A1, the hook 130 and the first support member 118 to secure the BOAS 106 to the support structure 114. The first support member 118 may have a protrusion 150 on the first support member 118 having a vector component in the radial direction to provide additional contact for the retainer 152. The retainer 152 may be generally c-shaped to fit over the BOAS 106 and first support member 118. The retainer 152 may have two legs 158, 160 that extend generally radially inward from an axial portion 153 to form a C shape. In an embodiment, as assembled, the legs 158, 160 extend from the axial portion 153 in a direction within 10° from the radial direction.

The geometry of the two legs 158, 160 act as a spring loaded clip. That is, distance between an end 155 of leg 158 and an end 157 of leg 160 is smaller in a relaxed position (i.e., before installation) than in an installed position. This smaller distance in the relaxed position creates a spring force. The legs 158, 160 clip or snap into place against the support 114 and BOAS 106, respectively. In the illustrated embodiment, the leg 160 is longer than the leg 158. In other words, the leg 160 extends further radially inward than the leg 158. In some embodiments, the retainer 152 may have a flange 156 to help assembly of the retainer 152 onto the BOAS 106 and first support member 118. The retainer 152 is assembled from a radially outboard position and may clip into place, for example. Radial assembly may be beneficial in situations where axial assembly is not ideal.

The retainer 152 acts as a seal that may or may not allow cooling air to pass in a controlled manner. In some embodiments, the retainer 152 may include an inlet slot or hole 154 to allow cooling air to enter the BOAS inlet 148 and into the BOAS chamber 137.

The assembly 105 may include a backup retention feature 161. The backup retention feature may be part of the engine static structure 36 or the support structure 112. The backup retention feature 161 may be a post, hook, or rib, for example. The backup retention feature 161 comes in close radial proximity to the retainer 152 during operation to prevent liberation of the retainer 152.

The retainer 152 may be formed from a piece of sheet metal. In one example, the sheet metal may be a ceramic matrix composite compatible material, for example. In another example, the retainer 152 is formed from multi-ply sheet metal, and the inner ply is a ceramic matrix composite compatible material. The retainer 152 may be a one piece circumferential split-ring structure, or may contain a plurality of segments. In some embodiments, the outward axial face 159 of the retainer 152 may be used a sealing surface for brush and/or W seals.

Figure 5:
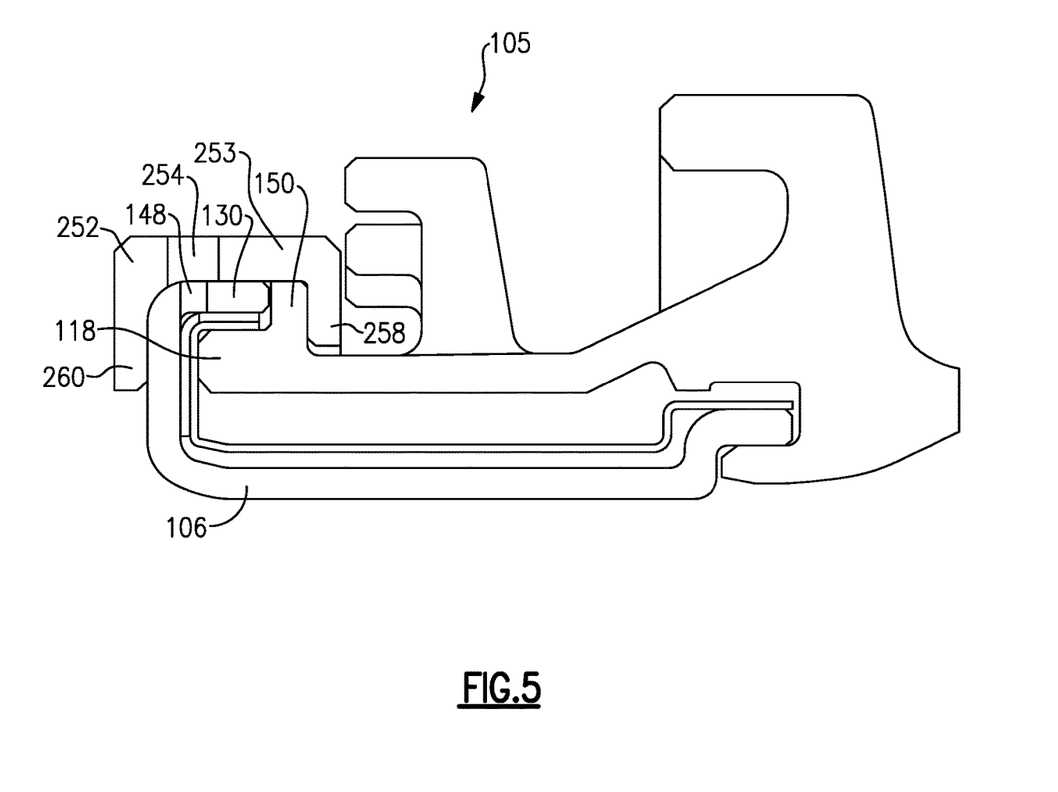
FIG. 5 shows a cross-sectional view through a blade outer air seal and support.

FIG. 5 illustrates another embodiment of the retainer 252. In this embodiment, the retainer 252 is machined, rather than formed from sheet metal. The legs 258, 260 extend radially inward from the axial portion 253 to form a C shape. This retainer 252 may be "snapped" onto the assembly 105, and may have a more robust retention. The retainer 252 may have a coating to make it compatible with ceramic matrix composite materials.

Figure 6A:
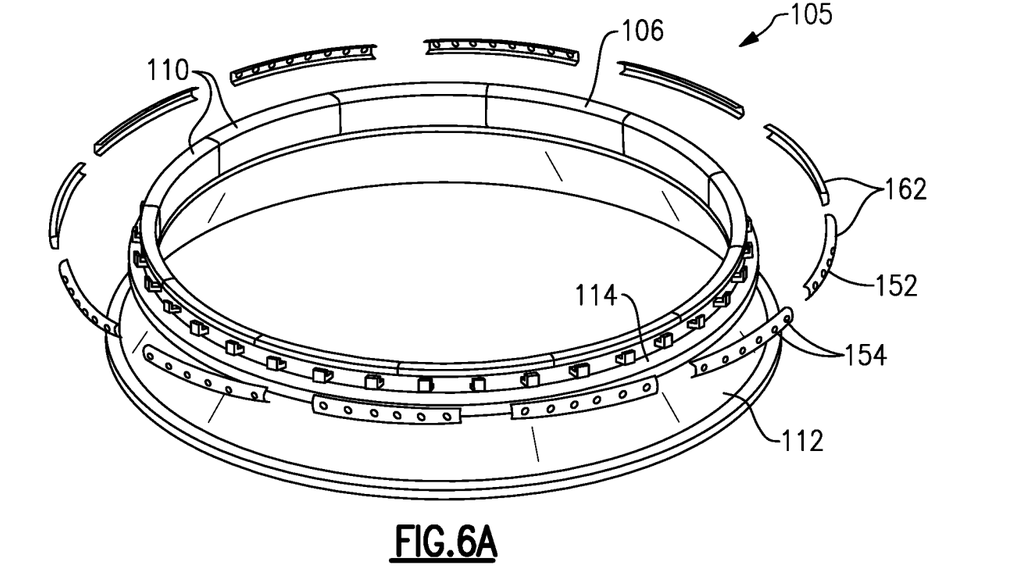
FIG. 6A shows an exploded view of a blade outer air seal assembly.

FIG. 6A illustrates an exploded view of the BOAS assembly 105. As shown, the retainer 152 is made up of several circumferential segments 162. In the illustrated example, there are twelve BOAS segments 110 and twelve retainer segments 162. However, more or fewer BOAS and retainer segments 110, 162 could be used. The retainer 152 could be segmented to have the same number of segments 162 as the BOAS 106, or could have a smaller number of segments 162. The number of retainer segments 162 may be a multiple of the number of BOAS seal segments 110. In an embodiment, the retainer 152 may be a single unitary piece.

In this embodiment, there are the same number of retainer segments 162 as seal segments 110, and the retainer segments 162 are offset from the seal segments 110. The number of retainer segments 162 may be a multiple of the number of BOAS seal segments 110. The retainer 152 may have a plurality of inlet holes 154, which are circumferentially aligned with the BOAS inlets 148 to permit cooling air into the BOAS assembly 105.

Figure 6B:
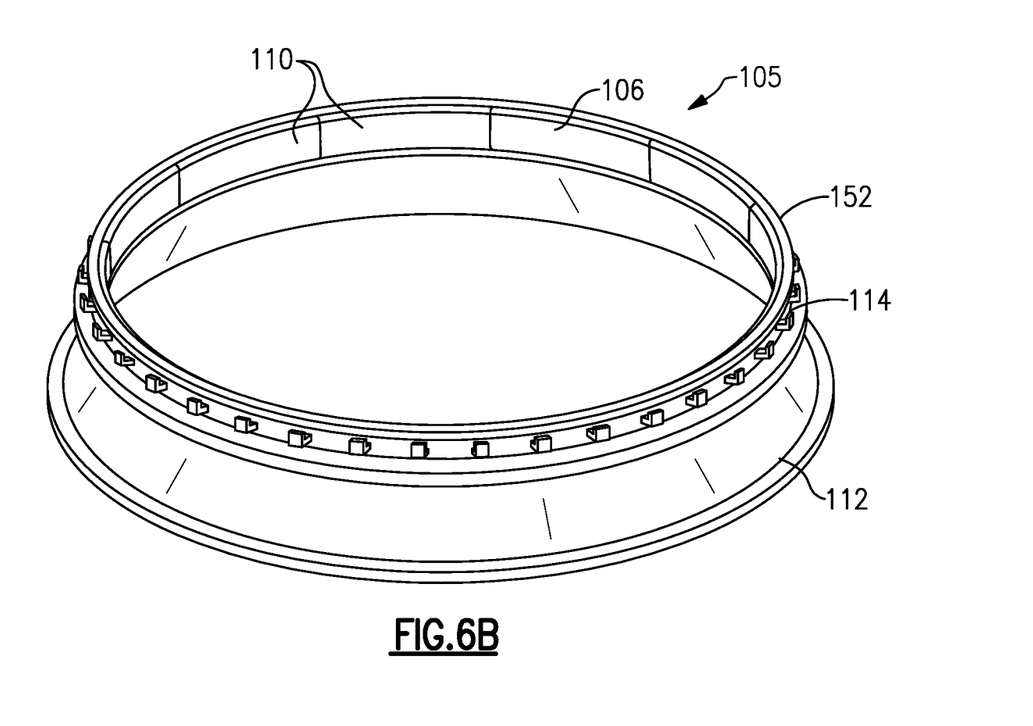
FIG. 6B shows a blade outer air seal assembly.

FIG. 6B illustrates the assembled BOAS assembly 105. The retainers 152 may be staggered with respect to the BOAS seal segments 110 for improved sealing. The retainer 152 may be a split ring, or have any number of segments. In an embodiment, a number of retainer segments is fewer than a number of BOAS seal segments 110.

In this disclosure, "generally axially" means a direction having a vector component in the axial direction that is greater than a vector component in the radial direction and "generally radially" means a direction having a vector component in the radial direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A blade outer air seal assembly, comprising:
   a support structure;
   a blade outer air seal extending circumferentially about an axis and mounted in the support structure, wherein the support structure has a first support member engaging a first axial side of the blade outer air seal and a second support member engaging a second axial side of the blade outer air seal; and
   a retaining clip securing the blade outer air seal to the support structure, wherein the retaining clip has a first leg and a second leg extending in a generally radial direction, the first leg abuts the first axial side and the second leg abuts the first support member.

2. The blade outer air seal assembly of claim 1, wherein the first and second legs extend from an axial portion such that the retaining clip forms a C shape.

3. The blade outer air seal assembly of claim 2, wherein the first leg and the axial portion are in contact with the blade outer air seal.

4. The blade outer air seal assembly of claim 2, wherein the second leg and the axial portion are in contact with the first support member.

5. The blade outer air seal assembly of claim 1, wherein the first and second legs act as a spring loaded clip.

6. The blade outer air seal assembly of claim 1, wherein the first leg is longer than the second leg.

7. The blade outer air seal assembly of claim 1, wherein the second leg has a flange at a radially inner end.

8. The blade outer air seal assembly of claim 1, wherein the retaining clip and blade outer air seal each have a passage for cooling air.

9. The blade outer air seal assembly of claim 8, wherein the retaining clip and blade outer air seal passages are circumferentially aligned to form a generally radial cooling passage.

10. The blade outer air seal assembly of claim 1, wherein the blade outer air seal comprises a plurality of segments arranged circumferentially to form an annulus about the axis.

11. The blade outer air seal assembly of claim 10, wherein the retaining clip comprises a plurality of clip segments arranged circumferentially to form an annulus about the axis.

12. The blade outer air seal assembly of claim 11, wherein the clip segments are offset from the blade outer air seal segments.

13. The blade outer air seal assembly of claim 10, wherein a number of clip segments is less than or equal to a number of blade outer air seal segments.

14. The blade outer air seal assembly of claim 13, wherein the number of blade segments is a multiple of the number of clip segments.

15. The blade outer air seal assembly of claim 1, wherein the support structure is a unitary circular structure.

16. The blade outer air seal assembly of claim 1, wherein the retaining clip is a metallic material.

17. The blade outer air seal assembly of claim 1, wherein the retaining clip is formed from sheet metal.

18. The blade outer air seal assembly of claim 1, wherein the structure is a metallic material and the blade outer air seal is a ceramic matrix composite material.

19. The blade outer air seal assembly of claim 1, wherein the blade outer air seal is a monolithic ceramic.

20. The blade outer air seal assembly of claim 1, wherein the blade outer air seal is formed from a different material than the retaining clip.

* * * * *